United States Patent [19]

Shaw

[11] Patent Number: 4,732,690
[45] Date of Patent: Mar. 22, 1988

[54] OIL RECOVERY COMPOSITION

[75] Inventor: James E. Shaw, Bartlesville, Okla.

[73] Assignee: Phillips Petroleum Company, Bartlesville, Okla.

[21] Appl. No.: 908,411

[22] Filed: Jun. 17, 1986

Related U.S. Application Data

[62] Division of Ser. No. 712,938, Mar. 18, 1985, Pat. No. 4,612,991.

[51] Int. Cl.$^4$ .............................................. E21B 43/22
[52] U.S. Cl. ................... 252/8.554; 166/273; 252/354; 252/356
[58] Field of Search ............. 166/273, 274, 275; 252/8.554, 354; 260/998.2; 530/331

[56] References Cited

U.S. PATENT DOCUMENTS

| | | | |
|---|---|---|---|
| 3,330,344 | 7/1967 | Reisberg | 166/273 X |
| 3,469,630 | 9/1969 | Hurd et al. | 166/273 X |
| 3,493,048 | 2/1970 | Jones | 166/275 |
| 3,985,722 | 10/1976 | Yoshida et al. | 260/998.2 X |
| 3,990,515 | 11/1976 | Wilchester et al. | 166/273 |
| 4,077,471 | 3/1978 | Shupe et al. | 166/275 |
| 4,120,358 | 10/1978 | Kalfoglou | 166/275 |
| 4,191,253 | 3/1980 | Kalfoglou | 166/275 |
| 4,194,565 | 3/1980 | Kalfoglou | 166/272 |
| 4,231,427 | 11/1980 | Kalfoglou | 166/275 |
| 4,284,517 | 8/1981 | Chen | 252/8.55 |
| 4,404,109 | 9/1983 | Tellier et al. | 252/8.554 |
| 4,485,872 | 12/1984 | Stapp | 252/8.554 X |
| 4,490,263 | 12/1984 | Stapp | 252/8.554 |
| 4,549,607 | 10/1985 | Morita et al. | 252/8.554 X |

*Primary Examiner*—Herbert B. Guynn
*Attorney, Agent, or Firm*—A. W. Umphlett

[57] ABSTRACT

A post-primary oil recovery process wherein the subterranean oil-bearing formation is treated by the sequential injection of (1) optional aqueous preflush to adjust connate water salinity, (2) aqueous saline surfactant system containing at least one acylated polypeptide salt surfactant, (3) optional thickened aqueous mobility buffer and (4) an aqueous drive, for the recovery of oil driven from the formation thereby.

9 Claims, No Drawings

OIL RECOVERY COMPOSITION

This application is a divisional of application Ser. No. 712,938, filed Mar. 18, 1985, now U.S. Pat. No. 4,612,991.

This invention relates generally to the recovery of oil from subterranean oil-bearing formations. In one aspect it relates to a process for a post-primary recovery of oil from subterranean oil-bearing formations. In another aspect this invention relates to improved techniques for enhancing the oil displacement efficiency of a post-primary oil recovery process. In accordance with a further aspect, this invention relates to the use of new surfactant systems for oil recovery. In accordance with still another aspect, this invention relates to an oil recovery process employing an aqueous saline fluid containing at least one acylated polypeptide surfactant optionally together with one or more cosurfactants for use in recovering oil from formations containing water having high salinity and hardness.

BACKGROUND OF THE INVENTION

Waterflooding is a commonly employed method for recovering additional amounts of petroleum beyond the amount recoverable by primary means, and comprises injecting field water into the formation to displace petroleum through the formation to the production well. Water does not displace petroleum efficiently, however, since oil and water are immiscible and the interfacial tension between water and oil is quite high. After completion of primary and secondary recovery, it is common to find that from 50 to 70 percent of the oil originally present in the formation still remains unrecovered in the formation.

It is recognized in the prior art that waterflooding can only recover a fraction of the oil present in the formation and there are many prior art references suggesting incorporating surface active agents or surfactants in the flood water for the purpose of reducing the interfacial tension between the injected water and the formation petroleum, which accomplishes recovery of a greater portion of the residual oil after primary production than is possible with water flooding. Many surfactants have been disclosed in many references for use in oil recovery operations, but many of these are limited with respect to formation water salinity, hardness and other factors which greatly reduce their applicability. Thus, it can be readily appreciated that there is a significant commercial need for an oil recovery method which can be applied to formations containing high salinity and hard water.

Accordingly, an object of this invention is to provide an improved process for the recovery of oil from subterranean oil-bearing formations.

Another object of this invention is to provide a process for the recovery of oil from subterranean oil-bearing formations which exhibits improved oil recovery efficiency.

Another object of this invention is to provide a surfactant system which is effective for post-primary oil recovery.

A further object of this invention is to provide a surfactant system for the recovery of oil from subterranean oil-bearing formations which is ecomonical in operation and uncomplicated in execution.

Other aspects, objects and advantages of the invention will become readily apparent to those skilled in the art from a reading of the following detailed description of the invention and the appended claims.

SUMMARY OF THE INVENTION

In accordance with the invention, it has been discovered that the use of acylated polypeptide salts as surfactants in surfactant flooding operations for oil recovery results in effective oil recovery at relatively high salinity.

In accordance with one embodiment of this invention, a new surfactant system has been discovered comprising salt water and at least one acylated polypeptide salt surfactant system which optionally contains at least one cosurfactant selected from hydrocarbon sulfonates and alcohols.

The process of one embodiment of the present invention can be generally characterized as a surfactantflood process involving the sequential injection of: (1) optional aqueous preflush to adjust connate water salinity, (2) aqueous saline composition comprising at least one acylated polypeptide salt surfactant, (3) optional thickened aqueous mobility buffer, and (4) an aqueous drive. The aqueous saline surfactant system can optionally contain an ionic surfactant such as hydrocarbon sulfonates, especially petroleum sulfonates, and/or cosurfactants such as alcohols, such as isopentyl alcohol. These systems are effective for enhanced oil recovery in reservoirs characterized by high salinity connate water.

DETAILED DESCRIPTION OF THE INVENTION

The preferred surfactant system of this invention is an aqueous saline surfactant system optionally containing a protective agent. Generally, water is used containing a certain quantity of sodium chloride for practical reasons.

SURFACTANT

In accordance with this invention, acylated polypeptide salts are used as surfactants. These acylated polypeptide salts can be represented by the following structural formula:

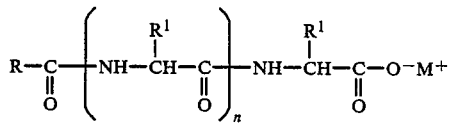

wherein R is a $C_9$ to $C_{19}$ alkyl, alkenyl, alkadienyl, and alkatrienyl group from a fatty acid, $R^1$ is a typical side chain of amino acids, M is an alkali metal cation, an alkaline earth metal cation, ammonium, or an amine group, and n is a positive integer.

The salts of the acylated polypeptides which can be used, in practice, include the alkali metals, particularly sodium and potassium, the alkaline earth metals, ammonium, and primary, secondary, and tertiary amines, particularly methyl, ethyl, propyl, butyl, and hexyl amines, ethylene diamine, diethylene triamine, and the like.

Representative examples of some of the acylated polypeptide salts of the type suitable for use in the present invention include:

Na salt of oleoylglycylglycine, and

Stepan Maypon 4C—The potassium salt of the condensation product of coconut fatty acids with a complex of polypeptides and amino acids derived from collagen protein. Typical acylated polypeptides in Stepan Maypon 4C would have R as $C_{11}$ (n-tridecyl) and n would be 2 or 3.

COSURFACTANTS

One of the cosurfactants that can be used in the surfactant system can broadly be a hydrocarbon sulfonate surfactant having an equivalent weight of from 225 to 600. Examples of hydrocarbon sulfonates include petroleum sulfonates, olefin sulfonates and alkyl sulfonates.

The preferred cosurfactant is a petroleum sulfonate. The petroleum sulfonates are commercially available products. The presently preferred surfactants used in oil recovery are petroleum sulfonates having an average equivalent weight in the range of 325 to 600. Best results with presently known reservoirs are believed to be obtainable with petroleum sulfonates having average equivalent weights of about 325 to 500.

Another preferred cosurfactant that can be used in the surfactant system of this invention is saturated or unsaturated alcohols having 1-12 carbon atoms per molecule or alcohols of 4-20 carbon atoms per molecule which have been ethoxylatd or propoxylated with an average of 1 to about 12 ethylene oxide or propylene oxide units per molecule, or mixtures of two or more of said alcohols.

Other cosurfactants that can be used in the surfactant system can be polar organic compounds, such as primary, secondary, or tertiary amines having 1-12 carbon atoms per molecule, phenol or phenols having a side chain of 1-10 carbon atoms per molecule, ketones having 3-12 carbon atoms per molecule, mercaptans having 2-12 carbon atoms per molecule, glycols having 2-18 carbon atoms per molecule, glycerols having 3-18 carbon atoms per molecule aldehydes having 2-12 carbon atoms per molecule, amides having 1-8 carbon atoms per molecule, a nitriles having 2-8 carbon atoms per molecule, and sulfoxides or sulfone having 2-12 carbon atoms per molecule. Also, the cosurfactant can be phenols, amines, mercaptans, glycols, or amides of 1-20 carbon atoms per molecule which have been ethoxylated or propoxylated with an average of 1-12 ethylene oxide or propylene oxide units per molecule.

Preferably, the cosurfactant is an alcohol having 3-8 carbon atoms per molecule, as such alcohols are soluble to an appropriate degree in both water and oil. Examples of the most preferred saturated alcohols, having 4 to 6 carbon atoms, include isobutyl alcohol, isoamyl alcohol, n-amyl alcohol, and n-hexyl alcohol. When an alcohol is to be selected for a particular formation, the shorter chain alcohols will generally be found most suitable for oils containing high molecular weight carboxylic acids, with the longer chain alcohols more suitable for oils containing lower molecular weight carboxylic acids.

Typical and preferred compositions of the surfactant system of this invention are shown in the following Table.

TABLE I

| Ingredient | Broad Range | Preferred Range |
| --- | --- | --- |
| Water (parts by wt.) | 100 | 100 |
| Hydrocarbon Sulfonate* (active parts by wt.) | 0.1–15 | 1–12 |
| Polypeptide (parts by wt.) | 0.05–15 | 1–7 |
| Alcohol (parts by wt.) | 0.05–15 | 0.05–5 |
| Protective Agent (parts by wt.) | 0.01–3 | 0.05–2 |

TABLE I-continued

| Ingredient | Broad Range | Preferred Range |
| --- | --- | --- |
| NaCl (parts by wt.) | 0–10 | 0.1–8 |

*The ranges for the active hydrocarbon sulfonate (e.g., petroleum sulfonate) in parts by weight. The "active" value is readily determined by multiplying parts by weight used and the fraction of active ingredients in the product.

OIL RECOVERY PROCESS

An oil recovery process using the surfactant system of this invention as defined above constitutes another embodiment of this invention. This process involves generally the conventional steps of post-primary oil recovery and distinguishes over the known procedures primarily in the use of acylated polypeptide alone or in admixture with hydrocarbon sulfonates and/or alcohols defined herein as cosurfactants.

PREFLUSH

It is optional to carry out a preflush step preceding the post-primary oil recovery operation. Such preflush operations are known in the art. Generally, a brine compatible with the surfactant system is injected via at least one injection well into the subterranean formation. Such a brine typically contains 2000–50,000 ppm salts, predominantly sodium choride. Preferably a brine solutin as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

SURFACTANTFLOODING

After the optional preflush step, the surfactant fluid of this invention is injected into the reservoir via at least one injection well. The surfactant system is injected in an amount usually in the range of about 0.001 to 1.0, preferably 0.01 to 0.25 pore volume based on the pore volume of the total treated and produced formation.

The preferred operation makes use of the aqueous saline surfactant system in the form of a single phase. Usually the surfactant system contains brine, acylated polypeptide surfactant and at least one cosurfactant, e.g., sulfonate and/or alcohol, as the principal ingredients. The single phase surfactant system is introduced into the formation via one or more injection wells and the generation of a microemulsion takes place in-situ as the injected surfactant system contacts the oil in place. It is contemplated that surfactant systems characterized by the presence of more than one phase are preferably subjected to continuous mixing during the injection operation.

The present invention can be utilized for a variety of subterranean reservoirs. The invention is, however, particularly preferred in reservoirs containing hard brine connate water. Such hard brines are characterized by a high content of $Mg++$ and $Ca++$ ions in the reservoir water. Typical hard brines contain more than 100 ppm of $Ca++$ and/or $Mg++$.

Protective agents are an especially preferred ingredient in the surfactant system of this invention when used for oil recovery from reservoirs with hard brines. They aid in solubilizing the surfactant in a high salinity environment. Examples of such protecting agents are polyethoxylated fatty alcohols and polyethoxylated alkylphenols. In addition, the sodium salts of sulfated polyethoxylated fatty alcohols and polyethoxylated alkylphenols are known in the art to function as protective agents.

MOBILITY BUFFER

Following the surfactant slug it is presently preferred, although again not necessary, to inject a mobility buffer solution into the reservoir. This buffer helps prevent fingering and enhances the efficiency of the oil recovery. Mobility buffer solutions are aqueous solutions of thickening agents. Examples of useful mobility buffers are aqueous and nonaqueous fluids containing mobility reducing agents such as high molecular weight partially hydrolyzed polyacrylamides, biopolysaccharides, cellulose ethers and the like. The mobility buffer contains 50 to 20,000, preferably 200 to 5,000, ppm of the mobility reducing agent in the fluid.

The injection of the mobility buffer fluid can be at a constant composition or the mobility buffer can be graded, i.e., the injection starts out at a relatively high concentration of mobility reducing agent at the leading edge and the concentration of said agent tapers off toward the trailing edge. As an example, the mobility buffer can start with a concentration of 2500 ppm of polyacrylamide in the water and end with 250 ppm of polyacrylamide in water. These mobility buffer fluids are well known in the art.

A suitable drive fluid can be injected into the formation subsequent to injection of the surfactant system or following the mobility buffer injection. The drive fluid can be fresh or salt water or other aqueous fluids compatible with an oil-bearing formation as known to those skilled in the art.

CORE CONDITIONING

The following conditioning procedure was used in preparing the waterwet Berea sandstone cores for surfactant flooding tests.

Berea sandstone cores measuring approximately 3 feet in length and 3 inches in diameter were dried under vacuum for 24 hours at 250° F. Polycarbonate disc end plates with centrally located $\frac{1}{8}''$ threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was sitrred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximaely 800 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine-Saturated Core Wt (g)} - \text{Dry Core Wt (g)}}{\text{Brine Density (g/mL)}} =$$

Core Pore Volume (mL)

The brine-saturated core was oil flooded in the conventional manner until oil break-through became detectable by a presence of alternate globules of oil and water in the effluent line. The oil flood was carried out to completion by the 24 hour recycling of oil through the core to remove all of the displaceable water. The total water displaced by the 24 hour recycle procedure was recorded as water displaced by oil flood. If desired, oil permeability was determined in a manner analogous to that used above for establishing original permeability to water. Prior to waterflood, the effluent line was air blown to remove oil.

The oil-flooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the water flood from the water volume displaced by the oilflood. At this point, the core simulated an oil reservoir which had been exhaustively waterflooded. Cores were routinely conditioned in this manner prior to carrying out surfactant flood tests.

EXAMPLE I

This example demonstrates the oil recovery effectiveness of a high-salinity-tolerant surfactant system containing an acylated polypeptide (Stepan Maypon 4C), a petroleum sulfonate (Witco Chemical Co. TRS 10-410) and brine containing as much as 1200 ppm $Ca^{++}$. Waterflood residual oil from a waterwet Berea sandstone core was recovered by the following sequel of injections: (1) the inventive saline surfactant system followed by (2) a thickened aqueous mobility buffer.

The surfactant slug had the following composition:
9.7 g Witco 10-410 (62 wt % active petroleum sulfonate)
17.2 g Stepan Maypon 4C (35 wt % active acylated polypeptide)
14.0 g NaCl
0.67 g $CaCl_2$ (anhydrous)
158.43 g Distilled Water
Thus, each component was present in the following weight percentages:

| | |
|---|---|
| Petroleum Sulfonate (active basis) | 3.0 wt. % |
| Acylated Polypeptide (active basis) | 3.0 wt. % |
| NaCl | 7.0 wt. % |

| -continued | |
|---|---|
| Ca++ | 0.12 wt. % |
| Water Added (200 g slug basis) | ca. 87 wt. % |

The pore volume of the 3"×3' cylindrical Berea sandstone core was 872 mL. Since an 87.3 mL slug of the above surfactant composition was injected, the slug size expressed in terms of core pore volume was 10% PV. The surfactant slug was followed by 436.3 mL (0.5 PV) of Betz Hi Vis polyacrylamide (5000 ppm) in aqueous sodium chloride (7 wt % NaCl) graded back logarithmically to 7 weight percent NaCl in water. The polyacrylamide solution was prepared by dissolving 2.5 g Betz Hi Vis polyacrylamide and 35 g NaCl in 465 mL of distilled water.

In preparing the core, 609.3 mL of water was displaced from the water-saturated core by oilflood indicating the introduction of approximately 609.3 mL of oil into the core. Subsequent waterflood resulted in approximately 281.5 mL of oil being displaced from the core leaving approximately 327.8 mL of waterflood residual oil in the Berea sandstone core piror to the surfactant flood.

In the course of the surfactant flood, a total effluent of 2.08 pore volumes (ca. 1822 mL) was collected which contained 160.4 mL of tertiary oil representing about 49% of the waterflood residual oil.

EXAMPLE II

This example demonstrates the oil recovery efficiency of a high-salinity-tolerant surfactant system comprising acylated polypeptide and petroleum sulfonates. The general procedure used in this run was somewhat different than that used in Example I: (a) the surfactant slug was preceded by a preflush slug of aqueous saline bicarbonate and (b) the surfactant slug was prepared in 11.2 weight percent aqueous sodium chloride. The mobility buffer was graded back logarithmically to 6.7 weight percent aqueous NaCl.

The preflush slug had the following composition:

| NaCl | 44.8 g |
|---|---|
| NaHCO3 | 12.0 g |
| Distilled Water | 343.2 g |

Thus, each component was present in the following weight percentages:

| NaCl | 11.2 wt. % |
|---|---|
| NaHCO3 | 3.0 wt. % |
| H2O | ca. 86 wt. % |

The surfactant slug had the following composition:
9.7 g Witco 10-410 (62 wt % active petroleum sulfonate)
17.2 g Stepan Maypon 4C (35 wt % active acylated polypeptide)
22.4 g NaCl
6.0 g NaHCO3
144.7 g Distilled Water
Thus, each component was present in the following weight percentages:

| Petroleum Sulfonate (active basis) | 3.0 wt. % |
|---|---|
| Acylated Polypeptide (active basis) | 3.0 wt. % |

| -continued | |
|---|---|
| NaCl (optimal salinity) | 11.2 wt. % |
| NaHCO3 | 3.0 wt. % |
| Water Added (200 g slug basis) | ca. 72 wt. % |

The pore volume of the 3"×3' cylindrical Berea sandstone core was 738 mL. A 147.6 mL (0.2 PV) slug of the preflush solution was injected before the injection of 73.8 mL (0.1 PV) of the surfactant solution. The surfactant slug was followed by 369 mL (0.5 PV) of Betz Hi Vis polyacrylamide (5000 ppm) in aqueous sodium chloride (6.7 wt. % NaCl) graded back logarithmically to 6.7 weight percent NaCl in water. The polyacrylamide solution was prepared by dissolving 5.0 g Betz Hi Vis polyacrylamide and 67 g NaCl in 933 mL of distilled water.

In preparing the core, 487.9 mL of water was displaced from the water-saturated core by oilflood indicating the introduction of approximately 487.9 mL of oil into the core. Subsequent waterflood resulted in about 204.1 mL of oil being displaced from the core leaving approximately 283.8 mL of waterflood residual oil in the Berea sandstone core prior to the surfactant flood.

In the course of the surfactant flood, a total effluent of 2.14 pore volumes (ca. 1580 mL) was collected which contained 119.1 mL of tertiary oil representing about 42% of the waterflood residual oil.

EXAMPLE III

This example demonstrates the oil recovery effectiveness of a high-salinity-tolerant surfactant system comprising acylated polypeptide and petroleum sulfonates. The procedure used in this run was essentially identical to that used in Example II except that the surfactant system was made up in 6.7 weight percent NaCl as was the preflush slug.

The preflush slug had the following composition:
26.8 g NaCl
12.0 g NaHCO3
361.2 g Distilled Water
Thus, each component was present in the following concentrations:

| NaCl | 6.7 wt. % |
|---|---|
| NaHCO3 | 3.0 wt. % |
| H2O | ca.90 wt. % |

The surfactant slug had the following composition:
9.7 g Witco 10-410 (62 wt. % active petroleum sulfonate)
17.2 g Stepan Maypon 4C (35 wt % active acylated polypeptide)
13.4 g NaCl
6.0 g NaHCO3
153.7 g Distilled Water
Thus, each component was present in the following concentrations:

| Petroleum Sulfonate (active basis) | 3.0 wt. % |
|---|---|
| Acylated Polypeptide (active basis) | 3.0 wt. % |
| NaCl | 6.7 wt. % |
| NaHCO3 | 3.0 wt. % |
| Water Added (200 g slug basis) | ca. 77 wt. % |

The pore volume of the 3"×3' cylindrical Berea sandstone core was 839 mL. A 167.8 mL (0.2 PV) slug of the preflush solution was injected before the injection of 83.9 mL (0.1 PV) of the surfactant solution. The surfactant slug was followed by 419.5 mL (0.5 PV) of Betz Hi Vis polyacrylamide (5000 ppm) in aqueous sodium chloride (6.7 wt. % NaCl) graded back logarithmically to 6.7 weight percent NaCl in water. The polyacrylamide solution was prepared by dissolving 5.0 g Betz Hi Vis polyacrylamide and 67 g NaCl in 933 mL of distilled water.

In preparing the core, 570 mL of water was displaced from the water-saturated core by oilflood indicating the introduction of approximately 570 mL of oil into the core. Subsequent waterflood resulted in about 252.4 mL of oil being displaced from the core leaving about 317.6 mL of waterflood residual oil in the Berea sandstone core prior to the surfactant flood.

In the course of the surfactant flood, a total effluent of 1.9 pore volumes (ca. 1596 mL) was collected which contained 136.3 mL of tertiary oil representing about 43% of the waterflood residual oil.

Attention is called to the fact that the use of Witco 10-410 petroleum sulfonate at 6.7 weight percent NaCl in the *absence* of acylated polypeptide is precluded because said petroleum sulfonate is insoluble.

EXAMPLE IV

This example demonstrates the oil recovery efficiency of a high-salinity-tolerant surfactant system comprising acylated polypeptide and petroleum sulfonates. The procedure used in this run was essentially identical to that used in the previous examples except for the addition of sulfolane to the saline surfactant system.

The preflush slug had the following composition:
19.0 g NaCl
0.6 g NaHCO$_3$
180.4 g Distilled Water
Thus, each component was present in the following concentrations:

| NaCl | 9.5 wt. % |
|---|---|
| NaHCO$_3$ | 0.3 wt. % |
| H$_2$O | ca. 90 wt. % |

The surfactant slug had the following composition:
9.7 g Witco 10-410 (62 wt % active petroleum sulfonate)
17.2 g Stepan Maypon 4C (35 wt % active acylated polypeptide)
19.0 g NaCl
4.0 g Sulfolane
0.6 g NaHCO$_3$
149.5 g Distilled Water
Thus, each component was present in the following concentrations.

| Petroleum Sulfonate (active basis) | 3.0 wt. % |
|---|---|
| Acylated Polypeptide (active basis) | 3.0 wt. % |
| NaCl (optimal salinity) | 9.5 wt. % |
| Sulfolane | 2.0 wt. % |
| NaHCO$_3$ | 0.3 wt. % |
| Water Added (200 g slug basis) | ca. 75 wt. % |

The pore volume of the 3"×3' cylindrical Berea sandstone core was 780.6 mL. A 90.9 mL (0.116 PV) slug of the preflush solution was injected before the injection of 78 mL (0.1 PV) of the surfactant solution. The surfactant slug was followed by 390.3 mL (0.5 PV) of Betz Hi Vis polyacrylamide (5000 ppm) in aqueous sodium chloride (6.7 wt. % NaCl) graded back logarithmically to 6.7 weight percent NaCl in water. The polyacrylamide solution was prepared by dissolving 5.0 g Betz Hi Vis polyacrylamide and 67 g NaCl in 933 mL of distilled water.

In preparing the core, 537.3 mL of water was displaced from the water-saturated core by oilflood indicating the introduction of approximately 537.3 mL of oil into the core. Subsequent waterflood resulted in about 289.9 mL of oil being displaced from the core leaving prior to the surfactant flood.

In the course of the surfactant flood, a total effluent of 1.69 pore volumes (ca. 1322 mL) was collected which contained 107 mL of tertiary oil representing about 43% of the waterflood residual oil.

EXAMPLE V

This example demonstrates that the oil recovery effectiveness of a saline slug containing acylated polypeptide but not petroleum sulfonate was very poor. The waterflood residual oil from a waterwet Berea sandstone core was recovered by the following sequel of injections: (1) preflush solution of saline bicarbonate, (2) saline acylated polypeptide and (3) thickened aqueous mobility buffer.

The preflush slug had the following composition:
18.0 g NaCl
1.0 g NaHCO$_3$
181 g Distilled Water
Thus, each component was present in the following concentrations:

| NaCl | 9 wt. % |
|---|---|
| NaHCO$_3$ | 0.5 wt. % |
| H$_2$O | ca. 91 wt. % |

The acylated polypeptide slug had the following composition:
34.4 g Stepan Maypon 4C (35 wt % active acylated polypeptide)
18.0 g NaCl
1.0 g NaHCO$_3$
146.6 g Distilled Water
Thus, each component was present in the following concentrations:

| Acylated Polypeptide (active basis) | 6.0 wt. % |
|---|---|
| NaCl | 9.0 wt. % |
| NaHCO$_3$ | 0.5 wt. % |
| Water Added (200 g slug basis) | ca. 85 wt. % |

The pore volume of the 3"×3' cylindrical Berea sandstone core was 759.4 mL. A 78.5 mL (0.1 PV) slug of the preflush solution was injected before the injection of 77.9 mL (0.1 PV) of the acylated polypeptide solution. The latter slug was followed by 379.7 mL (0.5 PV) of Betz Hi Vis polyacrylamide (5000 ppm) in aqueous sodium chloride (6.7 wt. % NaCl) graded back logarithmically to 6.7 weight percent NaCl in water. The polyacrylamide solution was prepared by dissolving 5.0 g Betz Hi Vis polyacrylamide and 67 g NaCl in 933 mL of distilled water.

In preparing the core, 520.1 mL of water was displaced from the water-saturated core by oilflood indicating the introduction of approximately 520.1 mL of oil into the core. Subsequent waterflood resulted in about 217.7 mL of oil being displaced from the core leaving about 302.4 mL of waterflood residual oil in the Berea sandstone core prior to the acylated polypeptide flood.

In the course of the acylated polypeptide flood, a total effluent of 1.2 pore volumes (ca. 912 mL) was collected which contained 9.1 mL of tertiary oil representing about 3.0% of the waterflood residual oil.

EXAMPLE VI

This example demonstrates the oil recovery efficiency of the acylated polypeptide/petroleum sulfonate system at a salinity of about 8% NaCl. This run was carried out essentially in the same manner as the run described in Example I except for the presence of NaHCO$_3$ in both a preflush slug and the surfactant slug. In addition there was no added Ca$^{++}$ in this run: in Example I approximately 1200 ppm Ca$^{++}$ was added as anhydrous CaCl$_2$ and no preflush was used. Attention is also called to the fact that the surfactant slug in Example I contained no NaHCO$_3$.

The surfactant slug had the following composition:
9.7 g Witco 10-410 (62 wt % active petroleum sulfonate)
17.2 g Stepan Maypon 4C (35 wt % active acylated polypeptide)
16.0 g NaCl
1.0 g NaHCO$_3$
156.1 g Distilled Water
Thus, each component was present in the following concentrations:

| Petroleum Sulfonate (active basis) | 3.0 wt. % |
| Acylated Polypeptide (active basis) | 3.0 wt. % |
| NaCl (optimal salinity) | 8.0 wt. % |
| NaHCO$_3$ | 0.5 wt. % |
| Water Added (200 g slug basis) | ca. 78 wt. % |

The preflush slug had the following composition:

| NaCl | 16.0 g |
| NaHCO$_3$ | 0.6 g |
| Distilled Water | 183.4 g |

Thus, each component was present in the following weight percentage:

| NaCl | 8.0 wt. % |
| NaHCO$_3$ | 0.3 wt. % |
| H$_2$O | ca. 92 wt. % |

The pore volume of the 3"×3' cylindrical Berea sandstone core was 792.3 mL. A 80 mL (0.1 PV) slug of the preflush solution was injected before the injection of 79.2 mL (0.1 PV) of the surfactant solution. The surfactant slug was followed by approximately 396 mL (0.5 PV) of Betz Hi Vis polyacrylamide (2500 ppm) in aqueous sodium chloride (8 wt. % NaCl) graded back logarithmically to 8 weight percent NaCl in water. The polyacrylamide solution was prepared by dissolving 2.5 g Betz Hi Vis polyacrylamide and 40 g NaCl in 920 mL of distilled water.

In preparing the core, 545.7 mL of water was displaced from the water-saturated core by oilflood indicating the introduction of approximately 545.7 mL of oil into the core. Subsequent waterflood resulted in about 266.7 mL of oil being displaced from the core leaving approximately 279 mL of water flood residual oil in the Berea sandstone core prior to the surfactant flood.

In the course of the surfactant flood, a total effluent of 1.44 pore volumes (ca. 1140 mL) was collected which contained 73.9 mL of tertiary oil representing about 26% of the waterflood residual oil.

EXAMPLE VII

This example describes the preparation of oleoylglycylglycine (an acylated polypeptide) by the reaction of oleoyl chloride and glycylglycine in aqueous sodium hydroxide. This acylated polypeptide was used in the oil recovery run described in Example VIII.

A charge of 13.2 g (0.1 mole) of glycylglycine was dissolved in a solution of 4 g (0.1 mole) NaOH in 100 mL of distilled water and this mixture was transferred to a 1000 mL Erlenmeyer flask equipped with a magnetic stirring bar and positioned in an ice-water bath. To this rapidly stirred mixture, there were simultaneously added from separate dropping funnels 30 g (0.1 mole) oleoyl chloride and a solution of 4 g (0.1 mole) sodium hydroxide in 100 mL of distilled water. The additions required about 30 minutes and toward the end of the 30 minute period the reaction mixture was diluted with 100 mL distilled water to facilitate stirring.

For reaction work-up, the mixture was transferred to a separatory funnel, contacted with 300 mL of water and shaken. The mixture was extracted twice with 150 mL portions of ether and the remaining aqueous phase was transferred to a suitable vessel and acidified to a pH of about 3. The resulting precipitate was removed by suction filtration, washed with cold water and dried. The crude product was recrystallized once from chloroform to give 26.1 g of material melting over the range of 142°–145° C. An additional recrystallization from chloroform gave 21.0 g of product with m.p. 145°–147° C. This recrystallized sample was used in the run described in Example VIII.

EXAMPLE VIII

This example demonstrates the oil recovery effectiveness of an acylated polypeptide (i.e., oleoylglycylglycine prepared in Example VII)/petroleum sulfonate (Witco 10-410) at a salinity of about 6% NaCl. The oleoylglycylglycine was converted to its Na salt by neutralization with NaOH. This run was carried out in essentially the same manner as the runs described in the foregoing examples.

The preflush slug had the following composition:

| NaCl | 24.8 g |
| NaHCO$_3$ | 2.4 g |
| Distilled Water | 372.8 g |

Thus, each component was present in the following concentrations:

| NaCl | 6.2 wt. % |
| NaHCO$_3$ | 0.6 wt. % |

| | |
|---|---|
| H₂O | ca. 93 wt. % |

The surfactant slug had the following composition:
5.68 g oleoylglycylglycine
6.0 g Witco 10-410 (62 wt. % active petroleum sulfonate)
1.28 g 50 wt. % aqueous NaOH solution
12.4 g NaCl
1.2 g NaHCO₃
173.4 g Distilled Water
Thus, each component was present in the following concentrations:

| | |
|---|---|
| Oleoylglycylglycine, Na salt | 3.0 wt. % |
| Petroleum Sulfonate (active basis) | 1.86 wt. % |
| NaCl | 6.2 wt. % |
| NaHCO₃ | 0.6 wt. % |
| Water Added (200 g slug basis) | ca. 87 wt. % |

The pore volume of the 3"×3' cylindrical Berea sandstone core was 814.7 mL. A 81.4 mL (0.1 PV) slug of the preflush solution was injected before the injection of 81.4 mL (0.1 PV) of the surfactant solution. The surfactant slug was followed by approximately 407 mL (0.5 PV) of Betz Hi Vis polyacrylamide (4800 ppm) in aqueous sodium chloride (4 wt. % NaCl) graded back logarithmically to 4 weight percent NaCl in water. The polyacrylamide solution was prepared by dissolving 2.0 g Betz Hi Vis polyacrylamide and 20 g NaCl in 478 mL of distilled water. An additional 20 mL of 4% NaCl solution was added to the buffer before use.

In preparing the core, 548 mL of water was displaced from the water-saturated core by oilflood indicating the introduction of approximately 548 mL of oil into the core. Subsequent waterflood resulted in about 235.5 mL of oil being displaced from the core leaving approximately 312.5 mL of water flood residual oil in the Berea sandstone core prior to the surfactant flood.

In the course of the surfactant flood, a total effluent of 1.78 pore volumes (ca. 1446 mL) was collected which contained 70.5 mL of tertiary oil representing about 22% of the waterflood residual oil.

EXAMPLE IX

This example demonstrates the oil recovery effectiveness of oleoylglycylglycine (an acylated polypeptide)-/alcohol cosurfactant (e.g., 1-hexanol) system at a salinity of about 10.4 weight percent NaCl. The oleoylglycylglycine was converted to its Na salt by neutralization with NaOH. This run which also used an alcohol-containing preflush was carried out in essentially the same manner as the run described in Example VII.

The preflush slug had the following composition:

| | |
|---|---|
| NaCl | 20.8 g |
| 1-Hexanol | 6.0 g |
| NaHCO₃ | 1.2 g |
| Distilled Water | 172 mL |

Thus, each component was present in the following concentrations:

| | |
|---|---|
| NaCl | 10.4 wt. % |
| 1-Hexanol | 3.0 wt. % |
| NaHCO₃ | 0.6 wt. % |
| H₂O | ca. 86 wt. % |

The surfactant slug had the following composition:
11.36 g Oleoylglycylglycine (28440-20)
20.0 g 1-Hexanol
1.13 g NaOH
41.6 g NaCl
2.4 g NaHCO₃
324 mL Distilled Water
Thus, each component was present in the following concentrations:

| | |
|---|---|
| Oleoylglycylglycine, Na salt | 3.0 wt % |
| 1-Hexanol | 5.0 wt % |
| NaCl | 10.4 wt. % |
| NaHCO₃ | 0.6 wt. % |
| Water | ca. 81 wt. % |

The pore volume of the 3"×3' cylindrical Berea sandstone core was 791.8 mL. A 83 mL (0.1 PV) slug of the preflush solution was injected before the injection of 79.2 mL (0.1 PV) of the surfactant solution. The surfactant slug was followed by approximately 396 mL (0.5 PV) of Betz Hi Vis polyacrylamide (4500 ppm) in aqueous sodium chloride (6 wt. % NaCl) graded back logarithmically to 6 weight percent NaCl in water. The polyacrylamide solution was prepared by dissolving 4.5 g Betz Hi Vis polyacrylamide and 60 g NaCl in 936 mL of distilled water.

In preparing the core, 546.2 mL of water was displaced from the water-saturated core by oilflood indicating the introduction of approximately 546.2 mL of oil into the core. Subsequent waterflood resulted in about 239 mL of oil being displaced from the core leaving approximately 307.2 mL of water flood residual oil in the Berea sandstone core prior to the surfactant flood.

In the course of the surfactantflood, a total effluent of 1.35 pore volumes (ca. 1070 mL) was collected which contained 61.2 mL of tertiary oil representing about 20% of the waterflood residual oil.

A summary of the runs described in the examples is given below in Table I.

TABLE I

Oil Recovery with Acylated Polypeptide Systems

| Example No. | Ca⁺⁺ (Added ppm) | Preflush | Surfactant Slug Components | Recovery | Remarks (Salinity)# |
|---|---|---|---|---|---|
| I | 1200 | None | Witco 10-410ᵃ Maypon 4Cᵇ | 49 | Best recovery (7% NaCl) |
| II | None | NaHCO₃/NaCl | Witco 10-410ᵃ Maypon 4Cᵇ | 42 | (max. 11.2% NaCl) (min. 6.7% NaCl) |
| III | None | NaHCO₃/NaCl | Witco 10-410ᵃ Maypon 4Cᵇ | 43 | (6.7% NaCl) |
| IV | None | NaHCO₃/NaCl | Witco 10-410ᵃ | 43 | Sulfolane Cosurfactant |

TABLE I-continued
Oil Recovery with Acylated Polypeptide Systems

| Example No. | Ca++ (Added ppm) | Preflush | Surfactant Slug Components | Recovery | Remarks (Salinity)# |
|---|---|---|---|---|---|
| V | None | NaHCO$_3$/NaCl | Maypon 4C[b] Maypon 4C[b] | 3 | (max. 9.5% NaCl) No Witco 10-410[a] (max. 9% NaCl) (min. 6.7% NaCl) |
| VI | None | NaHCO$_3$/NaCl | Witco 10-410[a] Maypon 4c[b] | 26 | (8% NaCl) |
| VII | None | None | None | None | Laboratory preparation of oleoylglycylglycine |
| VIII | None | NaHCO$_3$/NaCl | Witco 10-410 OGG (Example VII)* | 22 | (max. 6.2% NaCl) (min. 4% NaCl) |
| IX | None | NaHCO$_3$/NaCl 1-Hexanol | OGG (Example VII)* 1-Hexanol | 20 | 1-Hexanol cosurfactant (max. 10.4% NaCl) (min. 6% NaCl) |

*OGG represents oleoylglycylglycine prepared in Example VII converted to its Na salt
[a]Witco Chemical Co. 10-410 petroleum sulfonate
[b]Stepan Chemical Co. Maypon 4C is the potassium salt of the condensation product of coconut fatty acids with a complex of polypeptides and amino acids from Collagen protein.
In regard to the designations "max." and "min.", it is noted that the core, preflush and surfactant slugs were generally prepared at the "maximum salinity" as were most of the mobility buffers; in a core run, following mobility buffer, the sodium chloride concentration was graded back logarithmically to the "minimum salinity". This pattern is distinctly different than the conventional procedure of grading back logarithmically to "fresh water", i.e., water with less than 500 ppm total dissolved solids. In examples I, III and VI, the salinity throughout each run was, respectively, 7 wt. % NaCl, 6.7 wt. % NaCl, and 8 wt. % NaCl.

The invention runs described in Examples I–IV demonstrate the good oil recovery of the instant systems at relatively high salinities. Example I further shows the good tolerance of said systems even with added calcium. The somewhat lower recovery in Example VI perhaps is caused by the slightly higher salinity (8% NaCl) compared to the 6.7% NaCl concentration in Example III.

Example V shows the poor oil recovery efficiency of Maypon 4C (an acylated polypeptide) in the absence of petroleum sulfonate at a salinity in the range of 6.7 to 9 wt. % NaCl. It should be noted that the use of Witco 10-410 petroleum sulfonate at ≦6 weight percent NaCl in the *absence* of acylated polypeptide is not possible because said petroleum sulfonate is insoluble. Runs VIII and IX involve the use of an experimental acylated polypeptide such as the Na salt of oleolglycylglycine (preparation described in Example VII). Example VIII demonstrates the use of oleoylglycylglycine (Na salt) as a cosurfactant with petroleum sulfonate at a salinity of ca. 6 weight percent NaCl. The petroleum sulfonate requires such a cosurfactant in order to be soluble at this salinity. Example IX demonstrates the use of oleoylglycylglycine (Na salt) as a surfactant with 1-hexanol as a cosurfactant at a salinity in the range of 6 to 10.4 wt. % NaCl. It is also noteworthy that 1-hexanol was used in a preflush slug in Example IX.

That which is claimed is:

1. An aqueous saline surfactant composition comprising
   (a) sodium chloride brine,
   (b) at least one acylated polypeptide salt surfactant represented by the following structural formula:

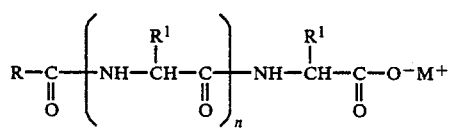

wherein R is a C$_9$ to C$_{19}$ alkyl, alkenyl, alkadienyl, or alkatrienyl group from a fatty acid, R$^1$ is a side chain of amino acids, M is an alkali metal cation, an alkaline earth metal cation, ammonium, or an amine group and n is a positive integer and
   (c) at least one cosurfactant selected from the group consisting of (1) hydrocarbon sulfonates selected from the group consisting of petroleum sulfonates, olefin sulfonates and alkyl sulfonates having an equivalent weight of from about 225 to about 600, and (2) an alcohol having 1–12 carbon atoms per molecule or an alcohol of 4–20 carbon atoms per molecule which has been ethoxylated or propoxylated with an average of 1–8 ethylene oxide or propylene oxide units per molecule or mixtures of two or more of said alcohols.

2. An aqueous composition according to claim 1 wherein for each 100 parts by weight of water sodium chloride is present in said brine in an amount from 0.1–8 parts by weight and acylated polypeptide is present in an amount from 1–7 parts by weight.

3. A composition according to claim 1 wherein said cosurfactant is present in an amount from 1–12 parts by weight per 100 parts by weight of water.

4. A composition according to claim 1 wherein said cosurfactant is a petroleum sulfonate.

5. A composition according to claim 1 wherein said cosurfactant is 1-hexanol.

6. An aqueous surfactant composition comprising
   (a) sodium chloride,
   (b) at least one acylated polypeptide salt represented by the following structural formula:

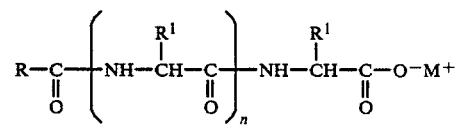

wherein R is a C$_9$ to C$_{19}$ alkyl, alkenyl, alkadienyl, or alkatrienyl group from a fatty acid, R$^1$ is a side chain of amino acids, M is an alkali metal cation, an alkaline earth metal cation, ammonium, or an amine group and n is a positive integer,
   (c) and at least one cosurfactant selected from (1) hydrocarbon sulfonates selected from a group consisting of petroleum sulfonates, olefin sulfonates and alkyl sulfonates having an equivalent weight of from about 225 to about 600, and (2) alcohols having 1-12 carbon atoms per molecule or an alcohol of 4-20 carbon atoms per molecule which has been ethoxylated or propoxylated with an average of 1-8 ethylene oxide or propylene oxide units per molecule or mixtures of two or more of said alcohols wherein for each 100 parts by weight of water (a) is present in an amount from 0.01-10 parts by weight, (b) is present in an amount from 0.05-15 parts by weight, and at least one of cosurfactant (c) or (d) is present in an amount from 0.15-15 parts by weight.

7. A composition according to claim 6 wherein (c) is petroleum sulfonate.

8. A composition according to claim 6 wherein (c) is 1-hexanol.

9. A composition according to claim 6 wherein (b) is an alkali metal salt of oleoylglycylglycine or alkali metal salt of the condensation product of coconut fatty acids with a complex of polypeptides and amino acids derived from collagen protein.

* * * * *